US011334608B2

(12) United States Patent
Mahata et al.

(10) Patent No.: US 11,334,608 B2
(45) Date of Patent: May 17, 2022

(54) METHOD AND SYSTEM FOR KEY PHRASE EXTRACTION AND GENERATION FROM TEXT

(71) Applicant: Infosys Limited, Bangalore (IN)

(72) Inventors: Debanjan Mahata, Freemont, CA (US); John Kuriakose, Pune (IN)

(73) Assignee: INFOSYS LIMITED, Bangalore (IN)

( * ) Notice: Subject to any disclaimer, the term of this patent is extended or adjusted under 35 U.S.C. 154(b) by 297 days.

(21) Appl. No.: 15/933,151

(22) Filed: Mar. 22, 2018

(65) Prior Publication Data
US 2019/0155944 A1 May 23, 2019

(30) Foreign Application Priority Data
Nov. 23, 2017 (IN) .............................. 201741042053

(51) Int. Cl.
*G06F 16/33* (2019.01)
*G06N 3/08* (2006.01)
(Continued)

(52) U.S. Cl.
CPC ........ *G06F 16/3344* (2019.01); *G06F 16/345* (2019.01); *G06F 16/9024* (2019.01); *G06F 16/93* (2019.01); *G06N 3/088* (2013.01)

(58) Field of Classification Search
CPC .... G06F 16/338; G06F 16/3344; G06F 16/93; G06F 16/345; G06F 16/9024
See application file for complete search history.

(56) References Cited

U.S. PATENT DOCUMENTS 9,015,046 B2 4/2015 Pereg et al.
9,390,161 B2 7/2016 Shehata et al.
(Continued)

FOREIGN PATENT DOCUMENTS

CN 106372061 2/2017
IN 283286 2/2007
(Continued)

OTHER PUBLICATIONS

Yu et al., "Learning Composition Models for Phrase Embeddings," *Transactions of the Association for Computational Linguistics*, vol. 3, pp. 227-242, 2015, 16 pages.
(Continued)

*Primary Examiner* — Mohammad S Rostami
(74) *Attorney, Agent, or Firm* — Troutman Pepper Hamilton Sanders LLP (Rochester)

(57) ABSTRACT

A system and method combining supervised and unsupervised natural language processing to extract keywords from text in natural language processing, the method includes receiving, through a processor, one or more entities through an input processing unit and converting the one or more entities into a standard document object. Further, parsing the standard document object through a text processing engine into one or more of a sentence and a token and selecting through a candidate identification engine one or more right candidates to be ranked. Further, assigning one or more scores to the one or more right candidates, ranking the one or more right candidates through a graph based ranking engine, creating a connected graph between the ranked one or more right candidates and assigning, through a phrase embedding engine, an edge weight to one or more edges between a right candidate and another right candidate.

19 Claims, 8 Drawing Sheets

(51) Int. Cl.
*G06F 16/93* (2019.01)
*G06F 16/901* (2019.01)
*G06F 16/34* (2019.01)

(56) References Cited

U.S. PATENT DOCUMENTS

| | | | |
|---|---|---|---|
| 9,495,357 B1* | 11/2016 | Smyros | G06F 40/211 |
| 9,645,987 B2 | 5/2017 | Ramanathan et al. | |
| 9,672,206 B2 | 6/2017 | Carus et al. | |
| 2007/0288404 A1* | 12/2007 | Kacmarcik | G06F 40/56 706/11 |
| 2008/0300872 A1 | 12/2008 | Basu et al. | |
| 2009/0319518 A1* | 12/2009 | Koudas | G06F 16/338 |
| 2011/0213655 A1* | 9/2011 | Henkin | G06Q 30/0251 705/14.49 |
| 2012/0109966 A1* | 5/2012 | Liang | G06F 16/338 707/740 |
| 2012/0143881 A1* | 6/2012 | Baker | G06F 16/367 707/750 |
| 2012/0209605 A1 | 8/2012 | Hurvitz et al. | |
| 2015/0100570 A1* | 4/2015 | Zent | G06F 16/334 707/723 |
| 2015/0120717 A1* | 4/2015 | Kim | G06F 16/335 707/727 |
| 2015/0186363 A1* | 7/2015 | Vashishtha | G06F 40/253 707/755 |
| 2015/0227619 A1* | 8/2015 | Xie | G06F 16/958 707/706 |
| 2015/0293932 A1* | 10/2015 | Takeda | G06F 16/93 707/722 |
| 2015/0324469 A1* | 11/2015 | Keyngnaert | G06F 16/9535 707/706 |
| 2015/0379425 A1* | 12/2015 | Dirac | G06N 20/00 706/12 |
| 2016/0154861 A1* | 6/2016 | Hegerty | G06F 40/232 707/728 |
| 2016/0350280 A1* | 12/2016 | Lavallee | G06F 40/284 |
| 2017/0017638 A1 | 1/2017 | Satyavarta et al. | |
| 2017/0101093 A1* | 4/2017 | Barfield, Jr. | G08G 1/096775 |
| 2017/0132730 A1 | 5/2017 | Takuma et al. | |
| 2017/0277668 A1* | 9/2017 | Luo | G06F 16/345 |
| 2018/0082215 A1* | 3/2018 | Mizobuchi | G06N 3/08 |
| 2018/0268038 A1* | 9/2018 | Keyngnaert | G06F 16/24578 |
| 2018/0342324 A1* | 11/2018 | Cha | C09K 11/025 |
| 2018/0349472 A1* | 12/2018 | Kohlschuetter | G06F 16/3322 |
| 2019/0155905 A1* | 5/2019 | Bach | G06F 40/30 |

FOREIGN PATENT DOCUMENTS

| | | |
|---|---|---|
| JP | 2016110284 | 6/2016 |
| WO | WO 2017084267 | 5/2017 |

OTHER PUBLICATIONS

Socher et al., "Learning continuous Phrase Representations and Syntactic Parsing with Recursive Neural Networks," https://nlp.stanford.edu/pubs/2010SocherManningNg.pdf, Department of Computer Science, Stanford University, 2010, 9 pages.

Extended European Search Report received in counterpart European Patent Application No. 18206845.2, dated Feb. 14, 2019, 8 pages.

Li et al., "A Semi-Supervised Key Phrase Extraction Approach: Learning from Title Phrases through a Document Semantic Network," Proceedings of the ACL 2010 Conference Short Papers, Jul. 11, 2010, pp. 296-300, 5 pages.

Bougouin et al., "Keyphrase Annotation with Graph Co-Ranking," Proceedings of the COLING 2016, the 26th International Conference on Computational Linguistics: Technical Papers, Nov. 7, 2016, pp. 2945-2955, 11 pages.

Bougouin et al., "TopicRank: Graph-Based Topic Ranking for Keyphrase Extraction," International Joint Conference on Natural Language Processing, Oct. 18, 2013, pp. 543-551, 9 pages.

Wang et al., "The Improvements of Textrank for Domain-Specific Keyphrase the Improvements of Text Rank for Domain-Specific Key Phrase Extraction," retrieved from the Internet: http://ijsst.info/Vol-17/No-26/paper11.pdf, Jan. 2016, 5 pages.

* cited by examiner

METHOD AND SYSTEM FOR KEY PHRASE EXTRACTION AND GENERATION FROM TEXT

FIELD OF TECHNOLOGY

The present disclosure relates to methods and systems for key phrase extraction and generation from text. More particularly, it relates to key phrase extraction from text documents and text fragments for natural language processing.

BACKGROUND

With the proliferation of information generated daily and accessible to users over the Web, the need for intelligent electronic assistants to aid in locating and/or discovering useful or desired information amongst the morass of data is paramount. The use of natural language processing to search text to correctly recognize people, places, or things is fraught with difficulties.

Keyphrase extraction is a fundamental technique in natural language processing. Keyphrase extraction enables documents to be represented by a concise set of phrases that may be used for indexing, clustering, ontology building, auto-tagging and other information organization schemes. Two major approaches of keyphrase extraction algorithms are supervised and unsupervised.

The supervised algorithms view keyphrase extraction as a supervised classification task in two stages: generating a list of candidate phrases, known as candidate identification and using labeled and/or annotated keyphrases to distinguish true keyphrases from non-keyphrase candidates. Selection models use a set of features that capture saliency of a phrase as a keyphrase. One of the most important advantage of a supervised approach is that the supervised approach may adapt to a specific nature of a set of documents at hand based on a representative training set. However these techniques may not offer enough insight into keyphrase extraction and what factors affect keyphrase extraction. Further, the supervised approach also allow users no room for process tuning even though a user and/or programmer may have an understanding of the document set aiding an automatic extraction process, and/or at least allow the users to experiment. However, one of the main disadvantages of the supervised approach is that once a model is trained on a dataset from a specific domain the model tends to show degraded performance in other domains.

In the unsupervised approach there are broadly two dominant techniques based on tf-idf term weighting scheme and page rank algorithm, respectively. In the tf-idf scheme, word statistics such as frequency of occurrence and rareness of occurrence are used for identifying keyphrases. On the other hand the schemes based on page rank treat the problem as graph ranking problem, where words/phrases are treated as nodes and edges are constructed between them reflecting their co-occurrence relations. The nodes of this graph is then ranked using page rank in order to get the keyphrases representing the document in the order of their salience. The main advantage of the unsupervised approaches is that they do not rely on specific domain and can extract keyphrases from documents coming from various domains. They also do not need to be trained and tuned before using. However, the generic nature of these algorithms also make them perform poorer than the supervised approaches in specific use cases. Historically, supervised approaches has always shown better accuracy in well-defined user tasks than the unsupervised approaches.

SUMMARY

Disclosed are a method, apparatus and/or a system to extract keywords from text in natural language processing.

In one aspect, a hybrid system to extract keywords from text in natural language processing includes a cluster computing network with one or more communicatively coupled nodes, a user interface, a knowledge engine, a text processing engine, an input processing engine, identified candidate repository, one or more processors and one or more memory units operatively coupled to one or more processors communicatively coupled over the cluster computing network. The one or more processors may have instructions stored thereon that, when executed by the one or more processors, cause the one or more processors to receive, through the one or more communicatively couple notes associated with the cluster computing network, one or more entities into the input processing engine. Further, the system converts, through the one or more processors, the one or more entities into a standard document object and parses, through the text processing engine, the standard document object into one or more of a sentence and a token. Still further, the system selects, through a candidate identification engine, one or more right candidates to be ranked and assigns, through the one or more processors, one or more scores to the one or more right candidates. The system rank, through a graph based ranking engine associated with the one or more processors, the one or more right candidates and creates, through the identified candidate repository, a connected graph between the ranked one or more right candidates. Further, the system assigns, through a phrase embedding engine, an edge weight to one or more edges between a right candidate and another right candidate.

In another aspect, a hybrid method to extract keywords from text in natural language processing, the method includes receiving, through a processor, one or more entities through an input processing unit and converting the one or more entities into a standard document object. The method further includes parsing the standard document object through a text processing engine into one or more of a sentence and a token and selecting through a candidate identification engine one or more right candidates to be ranked. Further, the method includes assigning one or more scores to the one or more right candidates, ranking the one or more right candidates through a graph based ranking engine, creating a connected graph between the ranked one or more right candidates and assigning, through a phrase embedding engine, an edge weight to one or more edges between a right candidate and another right candidate.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of the present invention are illustrated by way of example and not as limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system of extracting keywords and phrases from text in natural language processing. Although the present embodiments have been described with reference to specific example embodiments, it will be evident that various modifications and changes may be made to these embodiments without departing from the broader spirit and scope of the various embodiments.

Figure 1:
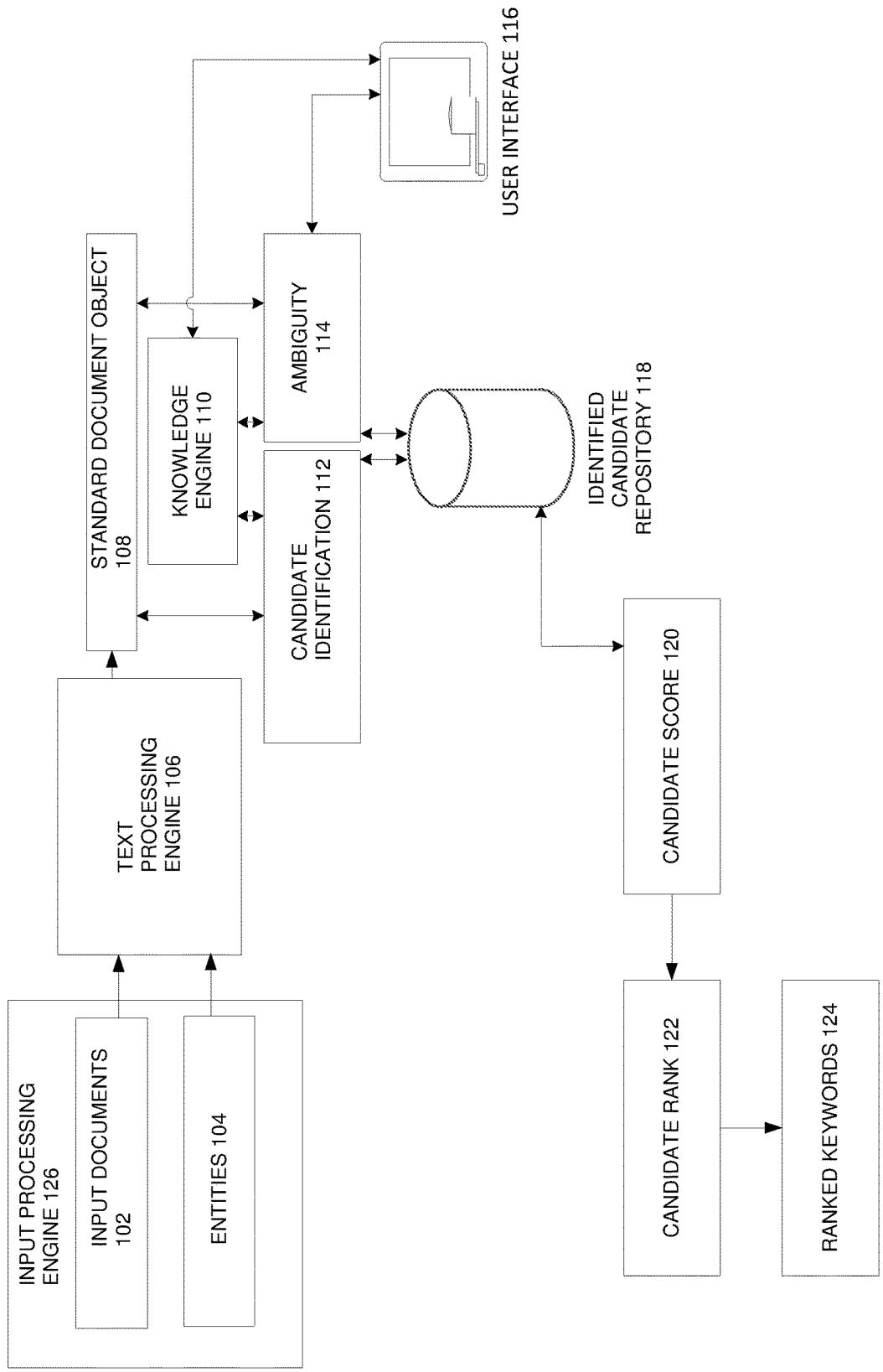
FIG. 1 illustrates a system to extract keyphrases and tokens from text, according to one embodiment.

FIG. 1 illustrates a system to extract keyphrases and tokens from text, according to one embodiment. The system to extract keywords from text in natural language processing includes a cluster computing network with one or more communicatively coupled nodes, a user interface 116, a knowledge engine 110, a text processing engine 106, an input processing engine 126, identified candidate repository 118, one or more processors and one or more memory units operatively coupled to one or more processors communicatively coupled over the cluster computing network. The one or more processors may have instructions stored thereon that, when executed by the one or more processors, cause the one or more processors to receive, through the one or more communicatively couple notes associated with the cluster computing network, one or more entities into the input processing engine. Further, the system converts, through the one or more processors, the one or more entities into a standard document object 108 and parses, through the text processing engine 106, the standard document object into one or more of a sentence and a token. Still further, the system selects, through a candidate identification engine, one or more right candidates to be ranked and assigns, through the one or more processors, one or more scores to the one or more right candidates. The system rank, through a graph based ranking engine associated with the one or more processors, the one or more right candidates and creates, through the identified candidate repository, a connected graph between the ranked one or more right candidates. Further, the system assigns, through a phrase embedding engine, an edge weight to one or more edges between a right candidate and another right candidate.

In one or more embodiments, the input processing engine 126 may be associated with input documents 102 and entities 104. The input processing engine 126 may be responsible for cleaning, normalizing and standardizing an input given to the system. The inputs may come from different sources such as the input documents 102 and entities 104. The input may be documents of any type, for example, OCR documents, PDF documents, Word Documents, Emails, Meeting Transcripts, Books, Speech to Text input, etc,. The input processing engine 126 may convert the input into a standard document object 108 that is further processed and used by other parts of the system. A type of cleaning, normalization and standardization step taken by the input processing engine 126 may depend upon the input.

In one or more embodiments, the systems and methods disclosed herein are hybrid in nature. Hybrid may be used to refer to a combination of supervised and unsupervised training approaches.

In one or more embodiments, a phrase embedding model may be trained by the input processing engine 126. In an example embodiment, the phrase embedding model may be a neural language model that is trained by using a Word2Vec approach. Parameters of the Word2Vec model may depend on a problem at hand and a type of documents to be processed. A training procedure may however different from the ones that are popularly used. Instead of using individual words and contexts of words as training and output instances, a mix of multi-word phrases and single words may be used. The phrases and the words may be obtained using the Text Processing engine 106. During a processing of text, in order to prepare the input for phrase embedding training procedure, an order in which the phrases and the words appear in the original text may be maintained. External corpus, apart from the input may also be used for training the model. A use of external corpus may increase the accuracy of the model. A choice of external corpus might be domain dependent. In an example embodiment, in an absence of any such training data, a standard model may be made available to be trained on the English Wikipedia corpus (publicly available), a huge corpus of news articles and scientific articles from sources such as arxiv.org (publicly available).

In one or more embodiments, advantages of the system described herein may include a hybrid approach that takes advantages of both supervised and unsupervised approaches in keyword extraction in order to build a robust model for keyword extraction, generation and ranking. Parsing text may be achieved by identifying named entities and noun phrases in order to select an initial set of candidate phrases while maintaining an order of occurrence.

In an example embodiment, the system may utilize a personalized PageRank for ranking keywords. In another example embodiment, the system may utilize a topic rank and/or personalized PageRank for ranking keywords.

A strongly connected graph may take into account edge weights due to frequency of co-occurrence of the strongly connected graph's nodes as well as similarity between the nodes in a phrase embedding space. The system may utilize phrase embedding in selecting candidate phrases and phrase embedding models to train phrase embedding. Further, the phrase embedding models may be used throughout a pipeline for generating document vectors, sentence vectors, candidate selection and ranking of candidates. The system disclosed herein may be used for single and multi-document keyword extraction and ranking. Further, the disclosed system may be used for extractive summarization and generative summarization processes.

In one or more embodiments, candidate identification 112 may include tokens obtained and used for selecting right candidates to be ranked. Further, the right candidates may be used for representing keywords of an input document. A token may be considered as a candidate only if it occurs in a sentence whose vector representation is similar to a vector representation of a source document. A threshold of the similarity value may be set for a task at hand and/or by observing a performance of the final ranked keywords in benchmark datasets.

For example, a default value may be set to 0.6. A similarity value used may be cosine distance similarity. The tokens that occur in sentences that have a similarity measure lesser than 0.6 with a document centroid vector may not considered for further processing. A narrow candidate list may overlook some true keyphrases (favoring precision), whereas a broad list may produce more errors and require more processing at a later selection stage (favoring recall). A choice of precision over recall, vice versa, may be completely dependent on the task.

In one or more embodiments, a candidate score 120 may be assigned to one or more right candidates to be candidate ranked 122.

In one or more embodiments, the system disclosed herein may take into account various advantages of both the supervised and unsupervised approaches to build a hybrid model that ties the supervised component and unsupervised component into a single framework, giving rise to a semi-supervised approach. Taking the best of the both worlds makes the system robust and high performant in terms of accuracy as compared with the existing systems.

Figure 2:
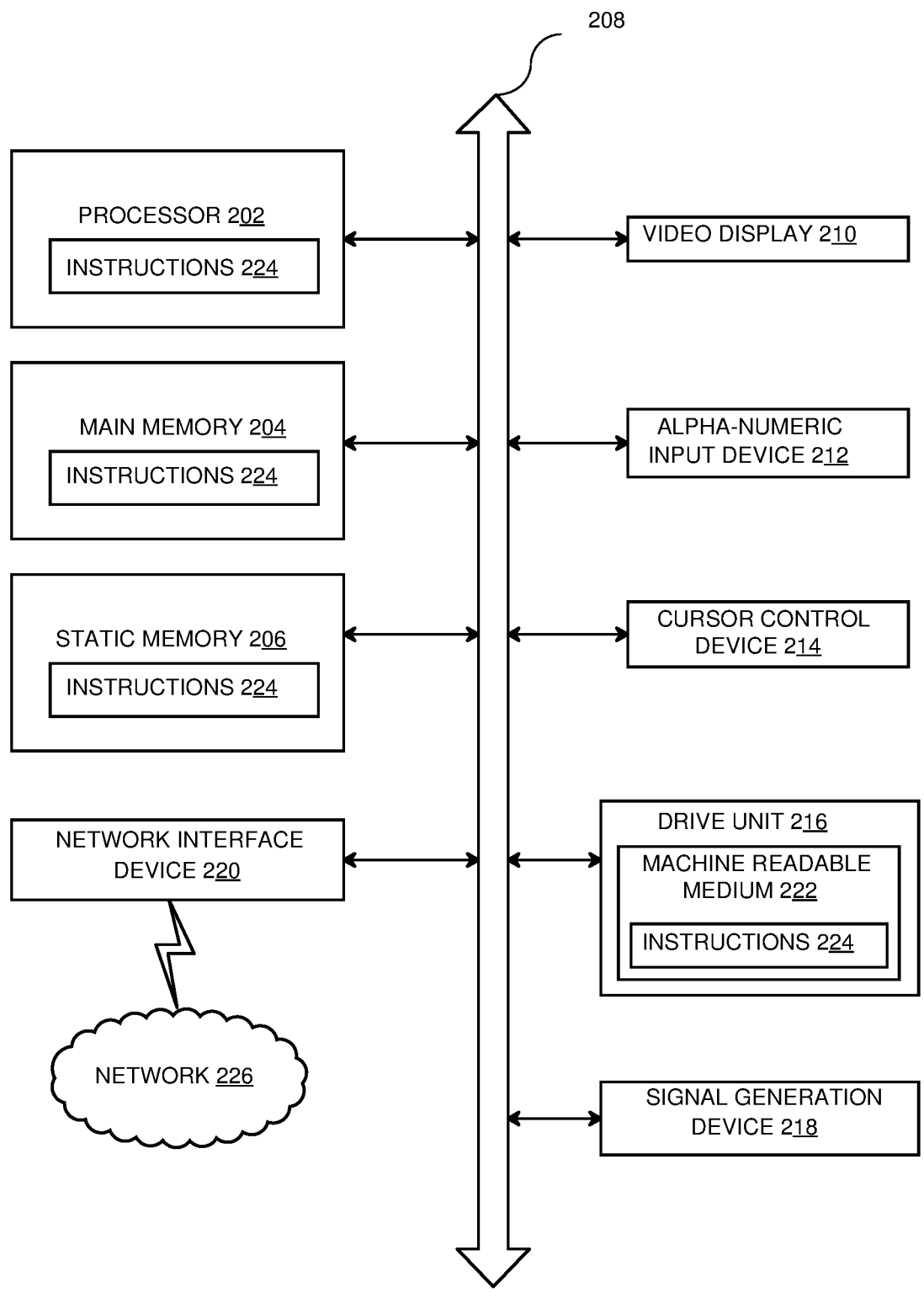
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein, according to an example embodiment. FIG. 2 shows a diagrammatic representation of machine in the example form of a computer system 200 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions 224 (e.g., software) embodying any one or more of the methodologies and/or functions described herein. The instructions 224 may also reside, completely and/or at least partially, within the main memory 204 and/or within the processor 202 during execution thereof by the computer system 200, the main memory 204 and the processor 202 also constituting machine-readable media.

The instructions 224 may further be transmitted and/or received over a network 226 via the network interface device 220. While the machine-readable medium 222 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and the like. The term "machine-readable medium" does not refer to signals.

Figure 3:
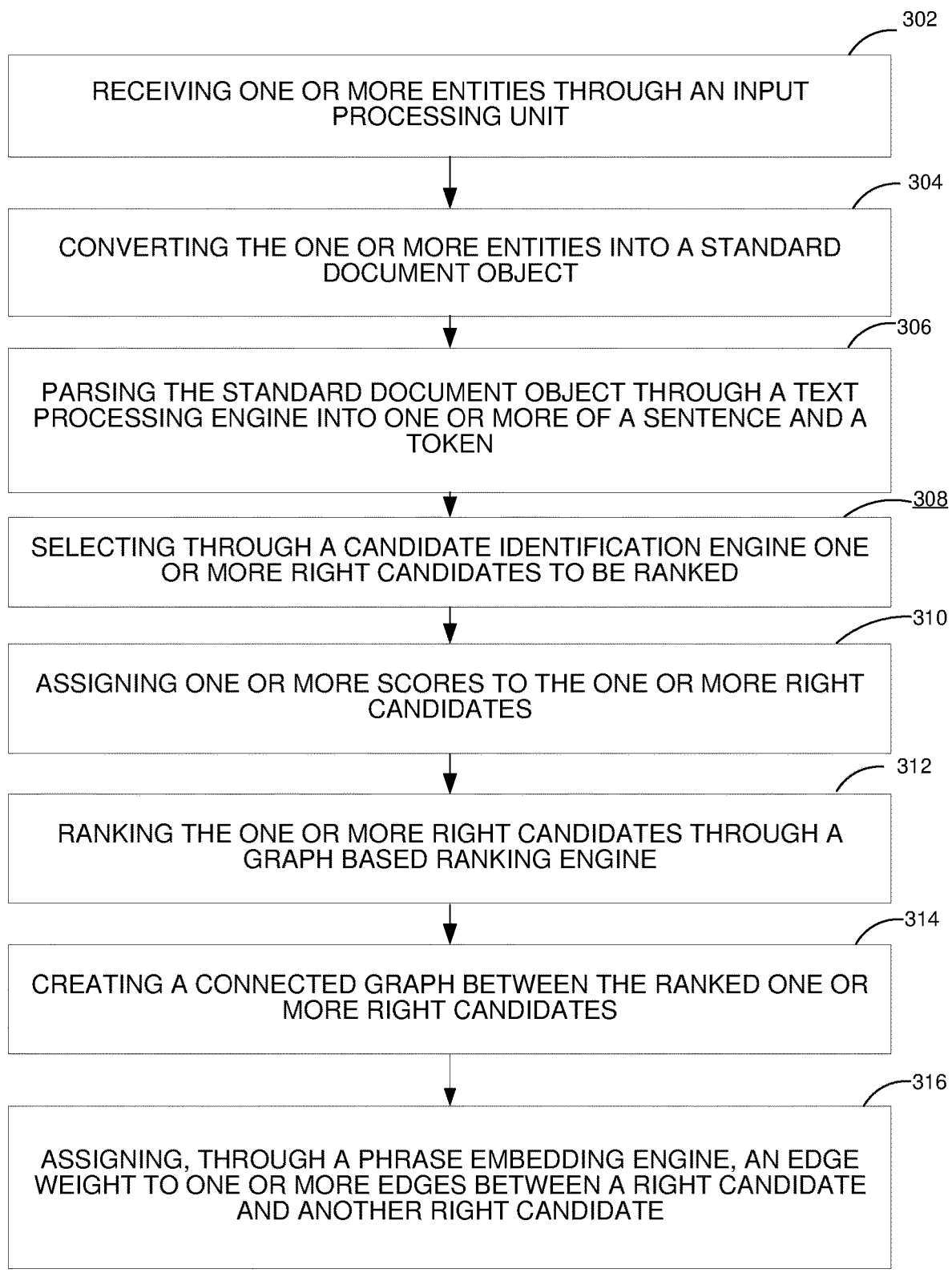
FIG. 3 is a process flow diagram detailing the operations of a method to extract keywords from text in natural language processing, according to one embodiment.

FIG. 3, is a process flow diagram detailing the operations of a method to extract keywords from text in natural language processing, the method includes receiving, through a processor, one or more entities through an input processing unit 302 and converting the one or more entities into a standard document object 304. The method further includes parsing the standard document object through a text processing engine into one or more of a sentence and a token 306 and selecting through a candidate identification engine one or more right candidates to be ranked 308. Further, the method includes assigning one or more scores to the one or more right candidates 310, ranking the one or more right candidates through a graph based ranking engine 312, creating a connected graph between the ranked one or more right candidates 314 and assigning, through a phrase embedding engine, an edge weight to one or more edges between a right candidate and another right candidate 316.

In one or more embodiments, if the system identifies the one or more entities, the one or more entities may be labelled as unambiguous. If the system is not able to identify the one or more entities, the one or more entities are labelled as ambiguous.

In one or more embodiments, one or more entities corresponding to domain specific entities may be determined based on domain ontology. One or more user actions are collected and maintained at the repository through a knowledge engine. In one or more embodiments, the entities, which are labelled as ambiguous are presented to a user through a user interface. The user may resolve the labelled ambiguous entities. In one or more embodiments, if an entity is not determined, the reason may be the domain details of the entity is not known to the system. Another reason may be, the domain of the entity is overlapping with more than one domains. For example, the entity 'Rome' may be a place or a name of a person. In such cases, the user may resolve the ambiguity 114 through the user interface 116.

Figure 4:
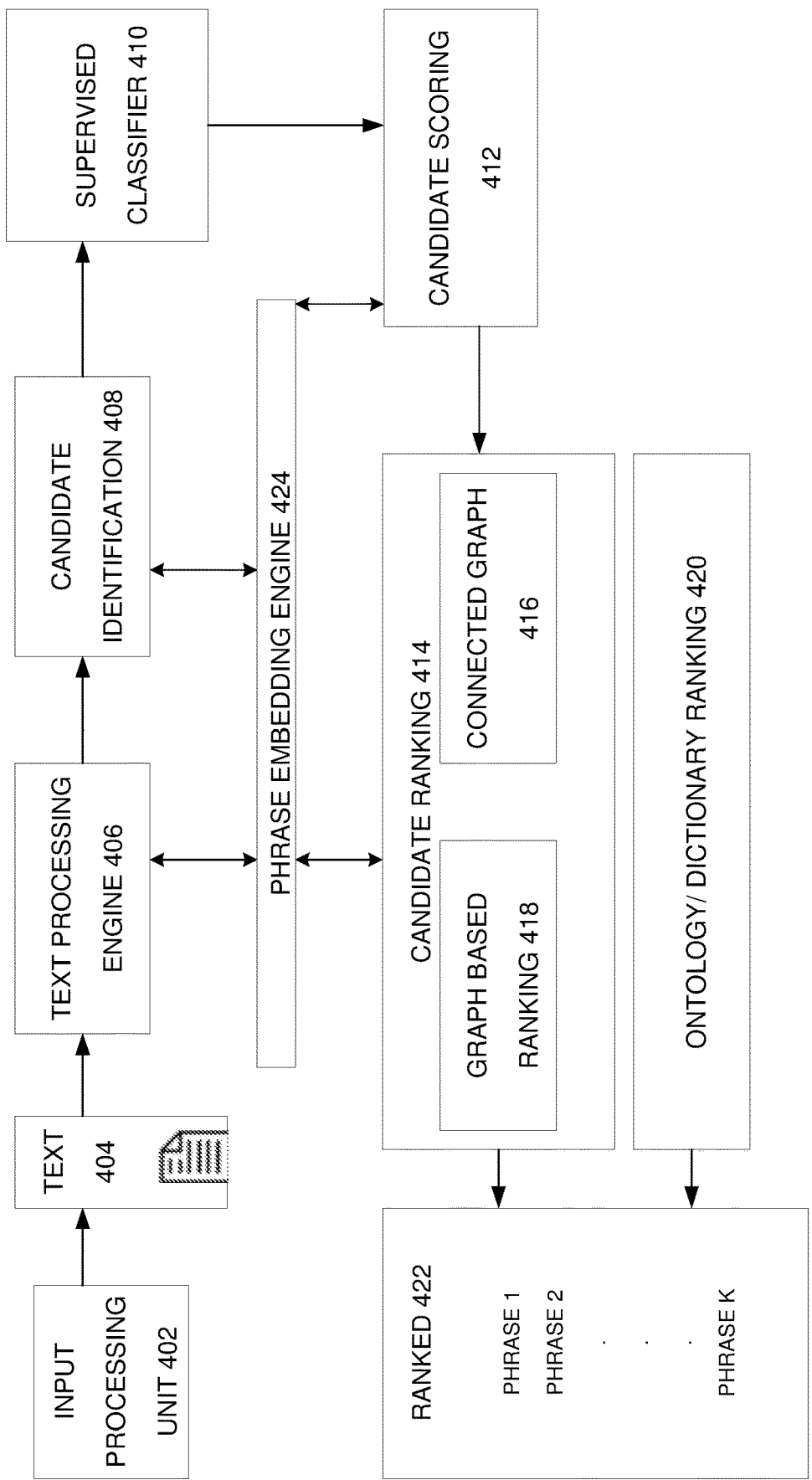
FIG. 4 illustrates the steps involved in the system disclosed herein, according to one embodiment.

FIG. 4 illustrates the steps involved in the system disclosed herein, according to one embodiment.

Input processing unit 402 receives input documents that may be processed into text 404. The text 404 may be utilized by the text processing engine 406 for candidate identification 406 through a candidate identification engine in association with a supervised classifier 410. Candidates identified by the candidate identification engine may be scored 412 and then ranked by a candidate ranking engine 414. The candidate ranking engine 414 may be associated with a graph based ranking 418 and a connected graph 416. The candidate ranking may work in conjunction with an ontology and/or dictionary ranking 420. A phrase embedding engine 424 may communicate with the text processing engine 406, the candidate identification 408, the candidate scoring 412, and the candidate ranking 414. Ranked entities and phrases 422 may be stored on a repository.

In an example embodiment, an input document set for training may be used to extract text and clean-up before creating a training file using one or more definitions. A trained model may be created based on the training file during a training phase.

The supervised classifier 410 may be used for assigning scores to the candidates chosen by the candidate identification engine 408.

In an example embodiment, the supervised classifier 410 may be a logistic regression classifier with l2 regularization. A trained classification model assigns a score between 0 and 1 to each candidate. The score represents a probability of the candidate to be a keyword for a document. Representative keywords may be expected to have higher probability. The supervised classifier 410 may take into account the features for each candidate that may be extracted by a Text Processing engine 406.

In one or more embodiments, the trained classification model may assign the score based on multiple factors such as a thematic similarity between a phrase and a document.

In one or more embodiments, different classifiers like Naïve Bayes, Ensemble classifier, RNNs or any other model may be used for assigning scores to candidates.

Figure 5:
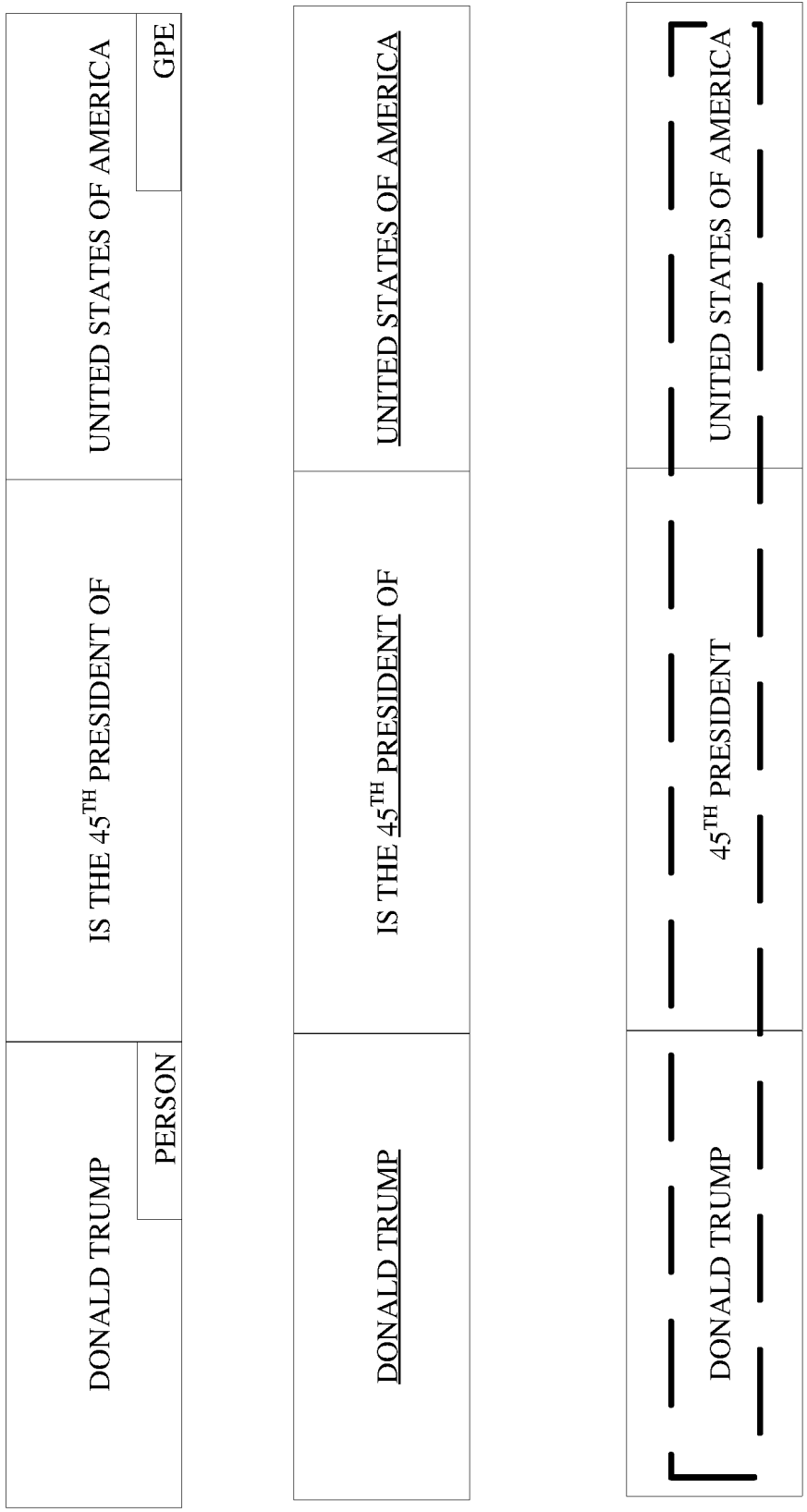
FIG. 5 illustrates the steps involved in identifying phrases in text, according to an example embodiment.

FIG. 5 illustrates named entity and noun phrase chunking, according to one embodiment.

In an example embodiment, once a standardization of an input document is completed, the system may parses a resultant text into sentences and tokens. However, while parsing into tokens, the system does not consider only single words as tokens, but takes into account a dependency parsing tree formed by a parser to identify chunks of meaningful tokens.

In an example embodiment, processing of text may involve the following steps:

Stop word Removal, removal of punctuations except ".", "?", "!" and "-", tokenizing into sentences and tokenizing the text into chunks of phrases that are either named entities and/or noun phrases. Each of the named entities and noun phrases may be considered as one single unit of token.

Further, while creating tokens, all the chunks that satisfy the following criteria for English language may be filtered out:
  Noun Phrases/Named Entities whose first word may belongs to a list of common adjectives and/or reporting verbs.
  Further, Noun Phrases/Named Entities whose first word belongs to following parts of speech: Interjection, Auxiliary, Coordinating Conjunction, Adposition, Interjection, Numeral, Particle, Pronoun, Subordinating Conjunction, Punctuation, Symbol and Other.
  Noun Phrases/Named Entities whose first word belongs to a list of functional words,
  Noun Phrases/Named Entities that contain a full numeric word,
  Noun Phrases/Named Entities that are fully numeric,
  Named entities that belong to the following categories may be filtered out: DATE, TIME, PERCENT, MONEY, QUANTITY, ORDINAL, and CARDINAL.

The phrase embedding model may be used for constructing a vector representation of each sentence by averaging the dense vector representation of each token constituting the sentence.

In an example embodiment, a dense vector representation of the document may also be made by averaging the dense vector representation of all the tokens extracted from the document. The vector representation is also known as the centroid vector of the document. The vector representation may vary depending upon a type of the document. For example, for scientific documents, a title of an article is a good vector representation of the document. For a Wikipedia article a first sentence, containing a title of a document could be taken as a document vector.

In one or more embodiments, the following features may be extracted for each token to be used by a supervised scoring module: frequency of occurrence of a token normalized by a total number of tokens in the document, a length of a token in number of words, a position of first occurrence of a token in a document normalized by the length of a document (no of characters in the document), a difference between a position of first occurrence and the position of last occurrence of a token normalized by length of the document, whether a token occurs among a first fifty tokens of a document, number of tokens that appear before a token normalized by a total number of tokens in a document, number of tokens that appear after a token normalized by a total number of tokens in a document and similarity of a token with a document vector.

Figure 6:
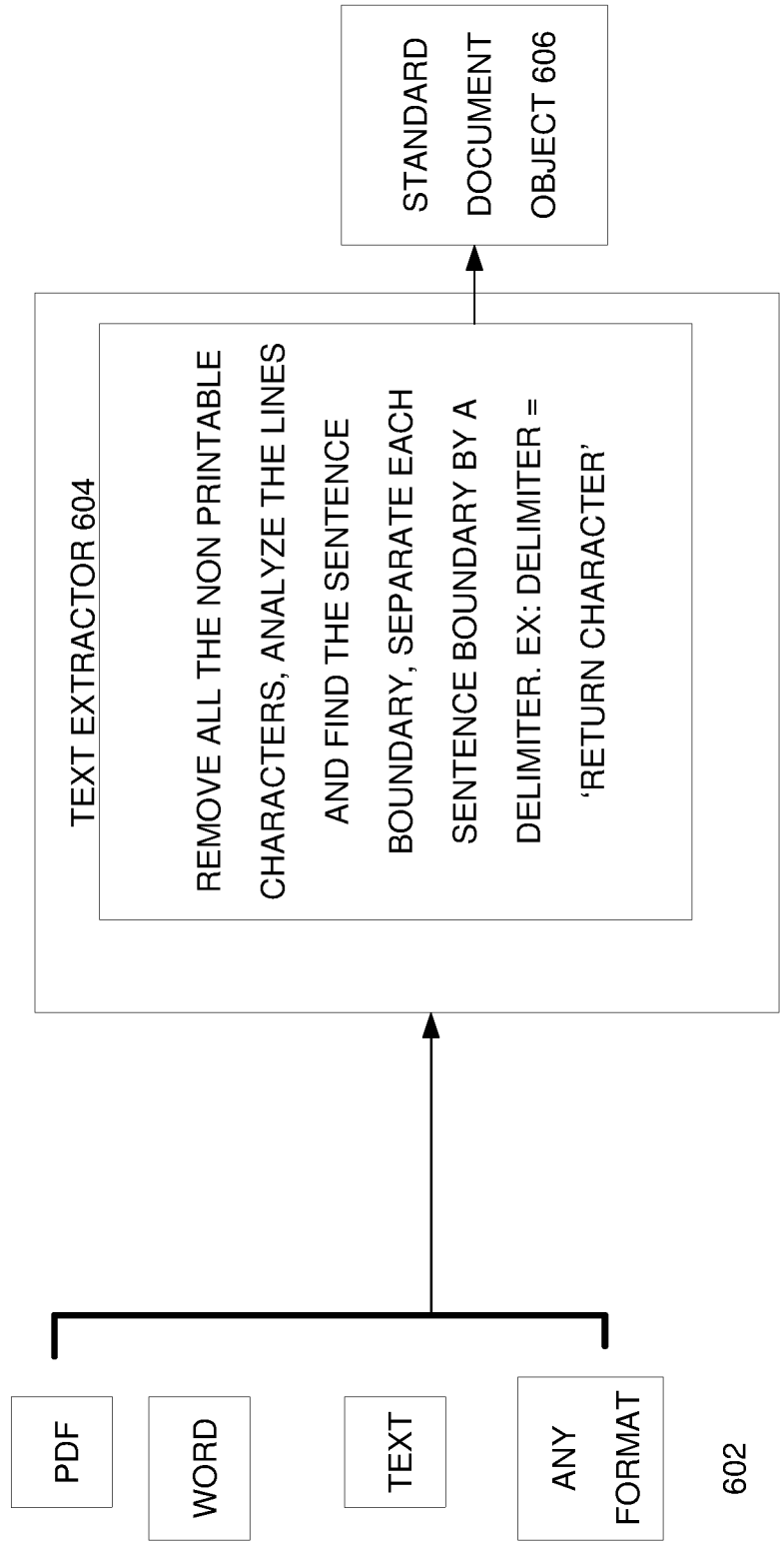
FIG. 6 illustrates the steps involved in extraction and clean up phase, according to one embodiment.

FIG. 6 illustrates the steps involved in extraction and clean up phase, according to one embodiment. Files of different formats such as PDF, Word, and text etc., 602 may be input to a text extractor 604. The text extractor 604 may remove all non-printable characters, analyze lines and find sentence boundaries. Further, the text extractor may separate each sentence boundary by a delimiter. The delimiter may be a 'return' character and/or a '.'. The extracted and cleaned data may be a standard document object 606.

Figure 7:
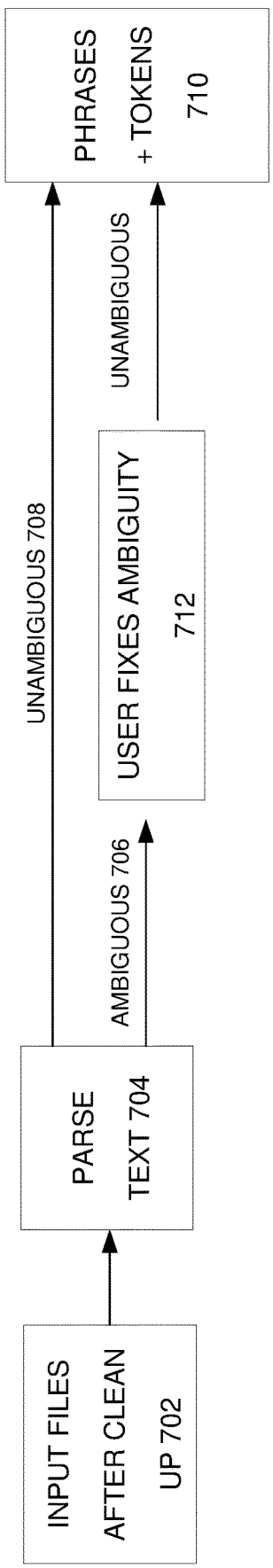
FIG. 7 illustrates the steps involved in parsing, according to one embodiment.

FIG. 7 illustrates the steps involved in parsing, according to one embodiment.

Input files after the preparation and clean up phase 702 may be parsed 704. The parsed text may be one or more of an ambiguous 706 and/or unambiguous 708. In case of unambiguous 708, the input files and/or extracted content of the input files may be processed into phrases and/or tokens 710. In case of ambiguity 706, a user may be prompted to fix one or more ambiguities 712.

Figure 8:
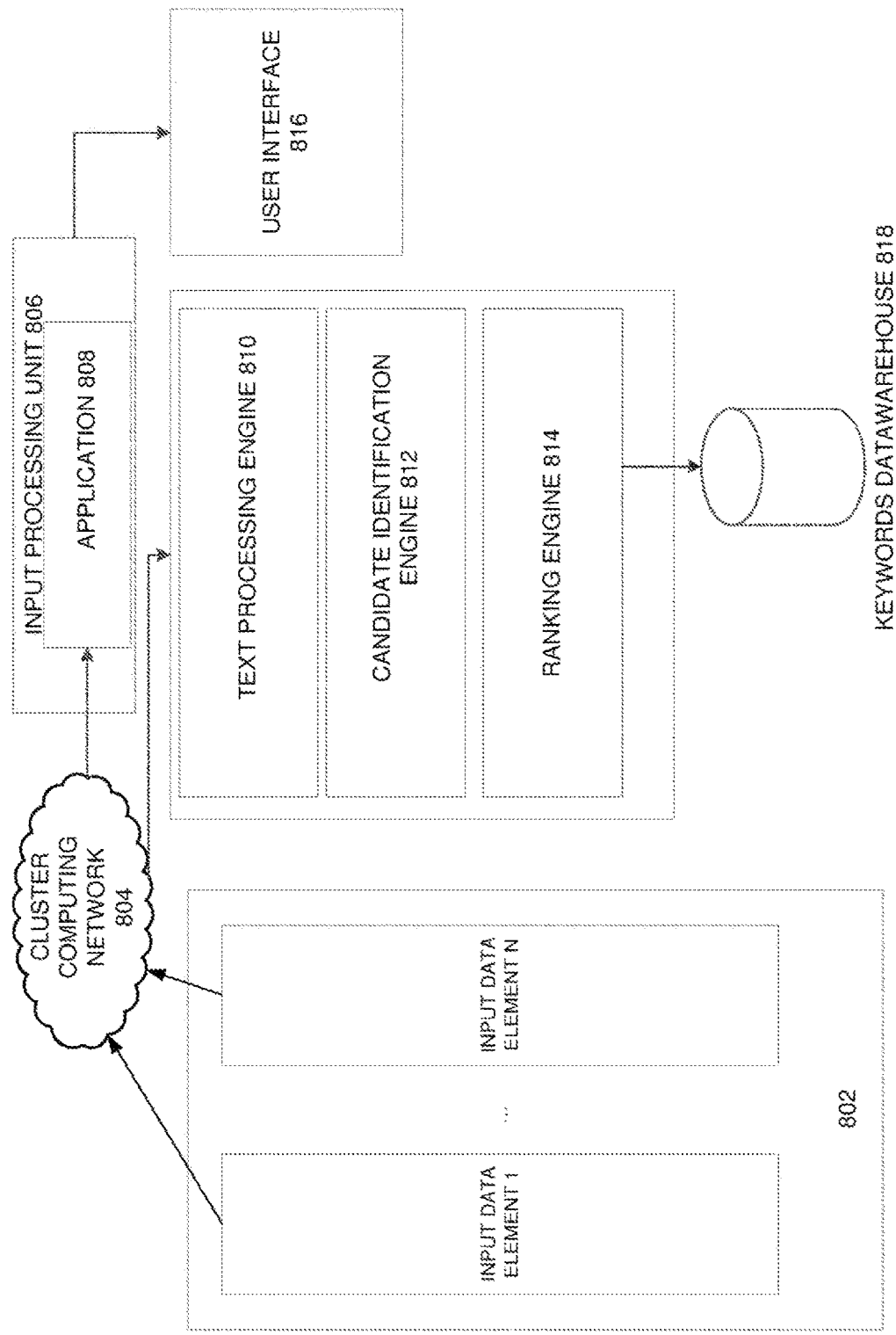
FIG. 8 is illustrates the various units involved in extracting keyphrases from text, according to one embodiment.

FIG. 8 is illustrates the various units involved in extracting keyphrases from text, according to one embodiment. One or more input data elements 802 may receive an input onto a cluster computing network 804. The cluster computing network 804 may be associated with an input processing unit 806. The input processing unit 806 may be associated with one or more application 808 to assist in processing input. The input processing unit 806 may be directly and/or indirectly coupled to a user interface 816. The cluster computing network 804 may be associated with text processing engine 810, candidate identification engine 812 and ranking engine 814. Ranked keywords and phrases may be stored onto a keywords datawarehouse 818.

In one or more embodiments, the phrase embedding engine may also be a word embedding engine. Further, phrases may be unigram, bigram, trigram and so on.

In one or more embodiments, phrase embedding may be during candidate selection. A thematic representation of a document may be created using phrase vectors (obtained from a phrase embedding model) of phrases extracted from the document. While selecting candidates for ranking (candidate identification), only those candidates may be chosen that are thematically similar to the document's central theme. A threshold for similarity may be domain and dataset specific. The threshold may be set by a user.

In one or more embodiments, in order to rank candidates for getting a top K keywords representing a given document a graph based ranking scheme may be used. A strongly connected graph may be constructed where candidates obtained by a candidate identification module may be considered as the graph's nodes. Each node of the graph may be connected with the other nodes forming edges of the graph. The edges are weighted according to the following scheme:

- A part of the weight comes from the normalized frequency of co-occurrence of two candidates given a context window (default=10). The scores are normalized between 0 and 1.
- Another part comes from the similarity between dense vector representations of the candidates. The scores also lie between 0 and 1.
- When two candidates do not co-occur in a given context window, then only a similarity score between the vectors may be considered and a default score of 0.1 is considered for the normalized co-occurrence frequency score between the two candidates.
- The two scores are finally multiplied in order to get the final edge weight.

In one or more embodiments, a use of phrase embedding model for assigning the edge weights between the candidates aid in connecting two phrases that may be semantically and syntactically similar to each other. The connection between two phrases may be missed by only following a strategy of connecting those phrases that co-occur with each other in the document. Further result may be in identifying important rare phrases appearing in the document that may otherwise be related to main phrases but not captured by the co-occurrence relationships.

The nodes of the graph may be ranked using Personalized PageRank, where the personalization scores of the nodes are assigned. The personalized PageRank may allow to introduce a bias towards those nodes that may be assigned high scores. Therefore, the nodes of the graph mutually reinforce each other during power iteration method for calculating final ranks. The ranking mechanism may leverage a property that important nodes may be more connected with other important nodes. The introduction of similarity scores using phrase embedding may also help in leveraging a global connections between two nodes apart from local connections that may only be present in the document. Thus, resulting in a more robust ranking process.

In absence of personalized scores, simple PageRank may be used for getting the final ranks. Several other graph based ranking processes may also be applied for ranking nodes. For example, in place of PageRank other ranking schemes such as HITS, BestCoverage, DivRank and TopicRank may also be used to achieve optimum results.

Ontology and/or dictionary based ranking 420 may be an optional module that depends on an availability of a domain specific ontology and/or a dictionary for adding boosts to final scores of ranked keywords obtained. There may be many domains rich in crowd-sourced dictionaries of phrases and words, as well as ontologies. On presence of the external resource, a boost may be given to any keyword if it occurs in any such external resource. For example, a boost of 10 may be given to the final scores of the keywords if it occurs in an automatically created dictionary of n-grams extracted from generic articles such as English Wikipedia titles.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method to extract keywords from text in natural language processing implemented by one or more computing devices, the method comprising:
    cleaning, normalizing and standardizing inputs in a plurality of formats and then converting the inputs into a standard document object in a text processing format and that comprises extracted sentences of text from the inputs with non-printable characters removed and sentence boundaries found and separated by a delimiter;
    parsing the standard document object to identify a sentence and a token included in the sentence, wherein the token is identified by filtering the sentence using a predetermined filtering criteria;
    selecting one or more right candidates from the sentence and the token for ranking, wherein the token is the selected one of the right candidates when a similarity index is determined by comparing a vector representation of the sentence with another vector representation associated with a source document, is above a similarity threshold;
    assigning at least one score to the selected one or more right candidates; ranking the one or more right candidates, wherein the ranking the one or more right candidates is performed in conjunction with an ontology and a dictionary ranking, wherein the ontology and the dictionary ranking depends on a domain specific ontology and a domain specific dictionary for adjusting a final score of the ranked one or more candidates;

creating a connected graph between the ranked one or more right candidates; and assigning an edge weight to at least one edge between a right candidate and another right candidate.

2. The method of claim 1, wherein the at least one edge is associated with the connected graph.

3. The method of claim 1, wherein the one or more right candidates to be ranked represent at least one keyword associated with the standard document object.

4. The method claim 1, wherein the selection of the one or more right candidates is through at least one selection model.

5. The method of claim 1, wherein at least one theme is associated with the inputs.

6. The method of claim 1, wherein at least one phrase vector is extracted from the inputs.

7. The method of claim 4, wherein the one or more right candidates are selected based on a thematic similarity with the inputs.

8. The method of claim 7, wherein a threshold for the thematic similarity is domain and dataset specific.

9. The method of claim 1 wherein:

the token comprises a plurality of words in a phrase that is named entity or noun phrase.

10. The method of claim 1 wherein:

a plurality of files of different formats are converted to standard document objects.

11. A system to extract keywords from text in natural language processing comprising:

at least one processor; and at least one memory unit operatively coupled to at least one processor and having instructions stored thereon that, when executed by the at least one processor, cause the at least one processor to:

clean, normalize and standardize inputs in a plurality of formats and then converting the inputs into a standard document object in a text processing format and that comprises extracted sentences of text from the inputs with non-printable characters removed and sentence boundaries found and separated by a delimiter;

parse the standard document object to identify a sentence and a token included in the sentence, wherein the token is identified by filtering the sentence using a predetermined filtering criteria;

select one or more right candidates from the sentence and the token for ranking, wherein the token is the selected one of the right candidates when a similarity index is determined by comparing a vector representation of the sentence with another vector representation associated with a source document, is above a similarity threshold;

assign at least one score to the selected one or more right candidates; ranking the one or more right candidates, wherein the ranking the one or more right candidates is performed in conjunction with an ontology and a dictionary ranking, wherein the ontology and the dictionary ranking depends on a domain specific ontology and a domain specific dictionary for adjusting a final score of the ranked one or more candidates;

create a connected graph between the ranked one or more right candidates; and assign an edge weight to at least one edge between a right candidate and another right candidate.

12. The system of claim 11, wherein the at least one edge is associated with the connected graph.

13. The system of claim 11, wherein the one or more right candidates to be ranked represent at least one keyword associated with the standard document object.

14. The system of claim 11, wherein the selection of the one or more right candidates is through at least one selection model.

15. The system of claim 11, wherein at least one theme is associated with the inputs.

16. The system of claim 11, wherein at least one phrase vector is extracted from the inputs.

17. The system of claim 11, wherein the one or more right candidates are selected based on a thematic similarity with the inputs.

18. The system of claim 17, wherein a threshold for the thematic similarity is domain and dataset specific.

19. A non-transitory computer readable medium having stored thereon instructions the non-transitory computer readable medium comprising machine executable code which when executed by at least one processor, causes the at least one processor to:

clean, normalize and standardize inputs in a plurality of formats and then converting the inputs into a standard document object in a text processing format and that comprises extracted sentences of text from the inputs with non-printable characters removed and sentence boundaries found and separated by a delimiter;

parse the standard document object to identify a sentence and a token included in the sentence, wherein the token is identified by filtering the sentence using a predetermined filtering criteria;

select one or more right candidates from the sentence and the token for ranking, wherein the token is the selected one of the right candidates when a similarity index is determined by comparing a vector representation of the sentence with another vector representation associated with a source document, is above a similarity threshold;

assign at least one score to the selected one or more right candidates; ranking the one or more right candidates, wherein the ranking the one or more right candidates is performed in conjunction with an ontology and a dictionary ranking, wherein the ontology and the dictionary ranking depends on a domain specific ontology and a domain specific dictionary for adjusting a final score of the ranked one or more candidates;

create a connected graph between the ranked one or more right candidates; and assign an edge weight to at least one edge between a right candidate and another right candidate.

\* \* \* \* \*